(12) United States Patent
Bergmiller

(10) Patent No.: US 7,837,258 B2
(45) Date of Patent: Nov. 23, 2010

(54) WIND DEFLECTOR IN MOTOR VEHICLES

(75) Inventor: Alexander Bergmiller, Koenigsbrunn (DE)

(73) Assignee: Webasto AG, Stockdorf (DE)

( * ) Notice: Subject to any disclaimer, the term of this patent is extended or adjusted under 35 U.S.C. 154(b) by 317 days.

(21) Appl. No.: 12/159,258

(22) PCT Filed: Dec. 21, 2006

(86) PCT No.: PCT/DE2006/002325

§ 371 (c)(1),
(2), (4) Date: Jun. 26, 2008

(87) PCT Pub. No.: WO2007/076836

PCT Pub. Date: Jul. 12, 2007

(65) Prior Publication Data

US 2010/0231008 A1    Sep. 16, 2010

(30) Foreign Application Priority Data

Dec. 30, 2005   (DE) ................. 10 2005 063 098
Mar. 20, 2006   (DE) ................. 10 2006 012 644

(51) Int. Cl.
*B60J 7/22* (2006.01)
(52) U.S. Cl. ...................................... 296/217
(58) Field of Classification Search ................ 296/217, 296/180.1, 180.5, 121, 219
See application file for complete search history.

(56) References Cited

U.S. PATENT DOCUMENTS

| | | | |
|---|---|---|---|
| 3,106,422 A * | 10/1963 | White ..................... 296/93 |
| 3,266,838 A * | 8/1966 | Heincelman ............. 296/121 |
| 5,018,782 A | 5/1991 | Fiegel et al. |
| 5,609,388 A | 3/1997 | Hattass et al. |
| 2003/0168892 A1 | 9/2003 | Bohm et al. |

FOREIGN PATENT DOCUMENTS

| | | |
|---|---|---|
| DE | 44 44 630 | 2/1996 |
| DE | 102 10 142 | 9/2003 |
| DE | 102 46 753 | 4/2004 |
| DE | 10 2004 026 834 | 9/2005 |
| EP | 0 385 263 | 9/1990 |
| WO | WO-2005/115783 | 12/2005 |

OTHER PUBLICATIONS

International Search Report for PCT/DE2006/002325 dated Nov. 5, 2007.

* cited by examiner

*Primary Examiner*—Dennis H Pedder
(74) *Attorney, Agent, or Firm*—Marshall, Gerstein & Borun LLP

(57) ABSTRACT

The invention relates to a wind deflector for a roof opening of a vehicle, which can be closed an partially opened by means of a displaceable roof part, comprising a bow-like base element which can be arranged in a roof opening edge area of the motor vehicle, a bow-like deployment element which is arranged over said base element and which is arranged in such a manner that it can pivot in relation to the base element, a deflector element which can be clamped between the base element and the deployment element, and at least one sealing element which is secured to the deployment element for reducing vehicle noises. The deflector element is secured directly to the sealing element. The invention also relates to a method for producing said type of wind deflector.

9 Claims, 4 Drawing Sheets

(A-A)

WIND DEFLECTOR IN MOTOR VEHICLES

BACKGROUND OF THE INVENTION

1. Field of the Invention

The present invention relates to wind deflectors in motor vehicles.

2. Related Technology

Although usable in any desired regions of a motor vehicle, the present invention and the problem on which it is based are explained in more detail with regard to a sliding roof of a motor vehicle. However, the present inventive concept can also be used, for example, on windows, sunroofs or panorama roofs of a vehicle.

A generally known problem with a motor vehicle sliding roof is that, when the cover is open, periodic fluctuations in pressure in the interior of the vehicle may occur when the vehicle is moving at low to medium speeds. Said periodic fluctuations in pressure are generally perceptible in the form of an annoying acoustic noise, for example in the form of "rumbling". Wind deflectors are generally used so as to avoid said fluctuations in pressure.

A wind deflector has the function of improving the flow conditions of the motor vehicle when, for example, the cover of a sliding roof is in an open position. The wind deflector is usually arranged at the front end, as seen in the direction of travel, of the roof opening opened up by the sliding cover, and is transferred from a retracted position, in which it is located below the outer surface of the vehicle roof, into a deployed position when the cover is opened.

Conventional wind deflectors have a bow-shaped base element and a bow-shaped deployment element arranged thereabove, between which elements a deflector net can be stretched open, as described in DE 102 10 142 A1. Wind deflectors of this type are frequently moved synchronously with the opening movement of the sliding roof cover along a predefined curved track by means of an active control mechanism fitted in lateral regions of the bow-shaped deployment element and on the roof opening frame. During the opening operation, after the initial upward movement and the forwardly directed slight pivoting movement of the cover, the sliding cover is pushed to the rear along a relatively long section of the lateral regions of the bow-shaped deployment element. The deployment element can only be fully deployed, i.e. fully pivoted upward, if it has been crossed over during the opening operation by an edge of the sliding roof cover which is on the vehicle front side. Said control mechanism has the result that, during said opening operation, a gap-like intermediate space is produced between the lower side of the sliding roof cover and a wind deflector part running in the transverse direction of the vehicle, said intermediate space having a gap width of approx. 5 mm. Said gap-like intermediate space causes undesirable wind noises and draft in the interior of the vehicle.

DE 10 2004 026 834 B3 contains one approach to remedying said problem. A deployment element here has a linear, flexible element on the upper side in order to seal the gap-like intermediate space during the opening or closing operation of the sliding roof cover. In this case, a deflector net which can be stretched out is fastened to the deployment element. The fastening usually takes place by means of weather strip elements which are fastened to an edge of the deflector net and are introduced into a groove in the deployment element. The process for installing the weather strip elements turns out to be highly complicated because each of the weather strip elements is positioned and inserted into the groove individually. Said process can be automated only with difficulty. This results in high piece costs and long installation times for such wind deflectors.

GENERAL DESCRIPTION OF THE INVENTION

Against this background, the present invention to provides a connection, which is better and in particular simplified in terms of installation, of a deflector element to a deployment element.

According thereto, a wind deflector is provided for a vehicle roof opening which can be closed and can be partially opened up by means of a moveable roof part, with a bow-shaped base element which is fitted in a roof opening edge region of the vehicle, with a bow-shaped deployment element which is arranged above the base element and is fitted in a manner such that it can pivot with respect to the base element, with a deflector element which is arranged between the base element and the deployment element and can be stretched open, and with at least one sealing element, which is fastened to the deployment element, for reducing driving noises, wherein the deflector element is fastened directly to the sealing element.

Furthermore, a method is provided for installing a wind deflector according to the invention, at least having a connection of the deflector element to the sealing element by sewing and/or adhesive bonding and/or welding and/or clamping and/or injection molding of the sealing element onto the wind deflector.

The present invention therefore has the advantage over the known approaches according to the prior art that by means of the direct fastening of the deflector element to the seal, both the outlay on installation can be reduced and also components can be saved. This is because the weather strip elements for fastening the deflector element to the deployment element are dispensed with by the invention. Furthermore, the complicated installation of the weather strip elements is dispensed with. In comparison to the attaching of weather strip elements to the deflector element and also the insertion of the weather strip elements into a groove on the deployment element, an automated installation of the deflector element on the seal and attaching of the seal to the deployment element can be realized in a simple manner, which leads to a reduction in the installation costs.

According to a preferred development, the sealing element is connected to the deflector element by a seam and/or an adhesive and/or a weld seam and/or a clamping connection and/or a cohesive material joint by the sealing element being injection molded on. Such a connection of the deflector element can be carried out in a simple manner in terms of installation, in particular even in an automated manner. Furthermore, a reliable connection can be provided between the deflector element and the sealing element.

In a further development of the invention, the sealing element is designed as a profile seal. Seals of this type can be optimally adapted in their shape to the gap which is to be sealed. In particular, the seal can have an open section and/or a closed section in accordance with requirements. The sealing element preferably has microcellular rubber and/or EPDM (ethylene-propylene-diene rubber) and/or silicone. Such materials have high damping properties and can therefore prevent rattling noises between the deployment element and the moveable roof part.

According to a furthermore preferred embodiment, when the roof opening is closed and/or the roof opening is partially opened up, the sealing element is in contact with the moveable roof part in at least partially sealing manner and/or forms a vibration-damping device between the deployment element and the moveable roof part. This permits an effective reduction in relative wind noises and rattling noises between the deployment element and the moveable roof part.

In a furthermore preferred development, when the roof opening is at least partially opened up, the sealing element can be brought into contact with a front roof flange of a roof edge, and the sealing element is designed in such a manner that, when the roof opening is at least partially opened up, the relative wind flows over the roof edge with little noise. An optimized flow over the edge of the roof opening can lead to a further reduction in the relative wind noises.

According to a further preferred development of the invention, the deployment element is connected to the sealing element by an adhesive and/or by a cohesive material joint by means of the sealing element being injection molded on and/or by a plug-in connection and/or by a clamping connection and/or by an expanding connection and/or by a clip connection and/or by a latching connection. The releasable connections have the advantage that they permit simple removal of the deflector element on the deployment element. A permanent connection between the deflector element and the seal affords the advantage that simpler installation is generally possible.

The deployment element is preferably designed as a profile part. This ensures a high degree of stability and distortion resistance of the deployment element in the relative wind. In particular, designing a deployment element as a plastic profile part and/or aluminum extruded profile part and/or magnesium die cast part is advantageous because they have high corrosion resistance and are simple to produce.

In a further advantageous development of the invention, the deflector element is designed as a fabric and/or air-permeable film. This serves to reduce the rumbling noises in the vehicle.

Furthermore, a method is provided by the invention for installing the wind deflector, at least having a connection of the deflector element to the sealing element by sewing and/or adhesive bonding and/or welding and/or clamping and/or injection molding of the sealing element onto the wind deflector. Such an installation process can be carried out in a simple manner in terms of installation, in particular even in an automated manner.

BRIEF DESCRIPTION OF THE DRAWINGS

The invention is explained in more detail below with reference to the exemplary embodiments which are illustrated in the schematic figures of the drawing, in which.

DETAILED DESCRIPTION

Figure 1A:
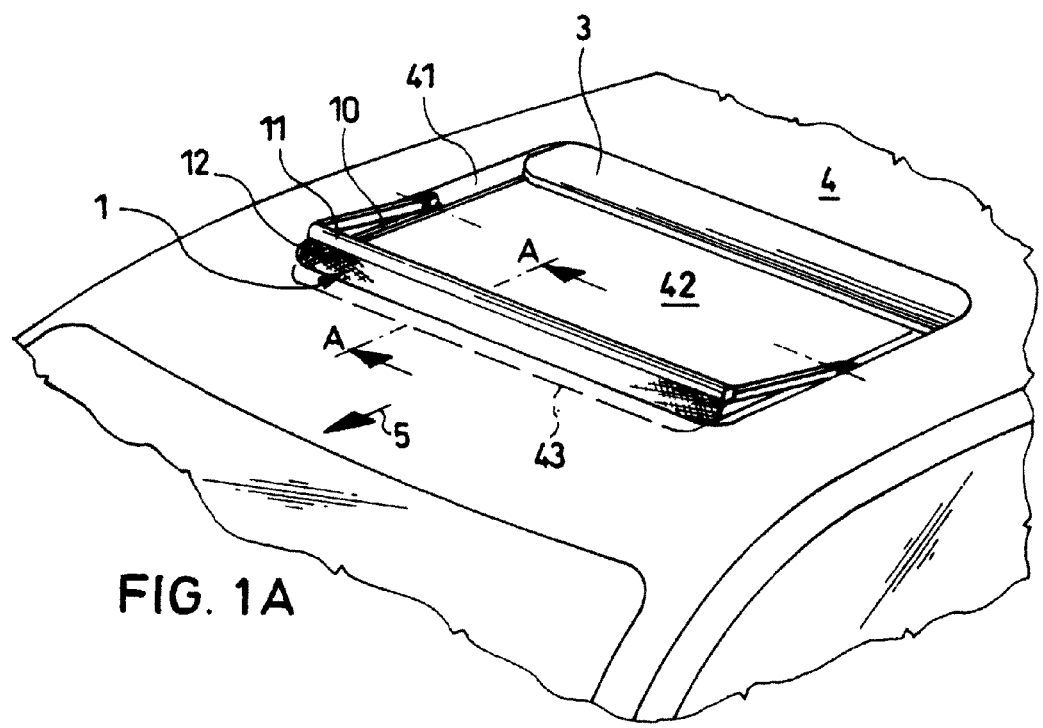
FIG. 1A shows a top view of a general construction of a wind deflector according to the invention.

In all of the figures of the drawing, identical or functionally identical elements have each been provided with the same reference numbers—unless stated otherwise.

Figure 1B:
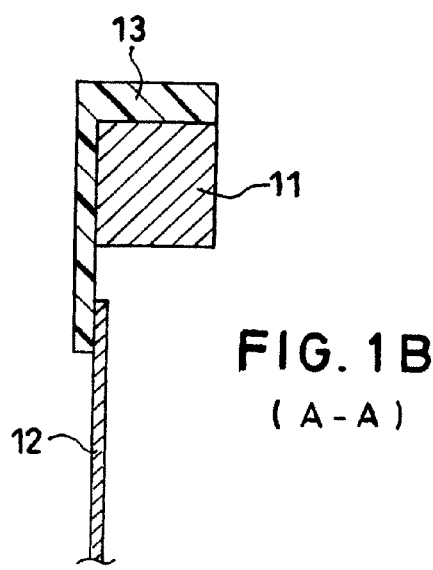
FIG. 1B shows a partial section A-A from FIG. 1A.

FIG. 1A and FIG. 1B respectively show schematically a top view and a partial section (A-A) of a general construction of a wind deflector 1 according to the invention. The wind deflector 1 is arranged in a roof 4 of a motor vehicle. In this case, the vehicle is moving in the direction indicated by the arrow 5. The roof 4 has a roof opening 42 which can be closed and can be partially opened up by means of a movable roof part 3. The wind deflector 1 has a bow-shaped base element 10 which is fitted in a roof opening edge region 41 of the roof 4. The base element 10 is arranged over a bow-shaped deployment element 11 which is fitted in a manner such that it can pivot with respect to the base element 10. A deflector element 12 which can be stretched out is arranged between the base element 10 and the deployment element 11. A sealing element 13 which is provided in order to reduce driving noises is fastened to the deployment element 11. The deflector element 12 is fastened directly to the sealing element 13.

Figure 2A:
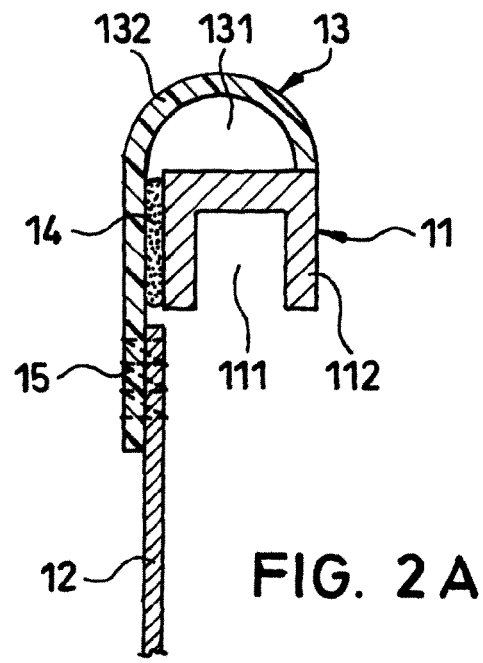
FIG. 2A shows a partial section through a first exemplary embodiment of the wind deflector according to the invention.

FIG. 2A shows a partial section according to a first exemplary embodiment of the wind deflector 1 according to the invention. The seal 13 is designed as a sealing lip and is fastened to an aluminum profile 11 which has a recess 111, by means of an adhesive 14. In this case, the seal 13 forms the cavity 131 together with the aluminum profile part 11. The wind deflector net 12 is fastened to the seal 13 by means of a textile thread 15.

Figure 3:
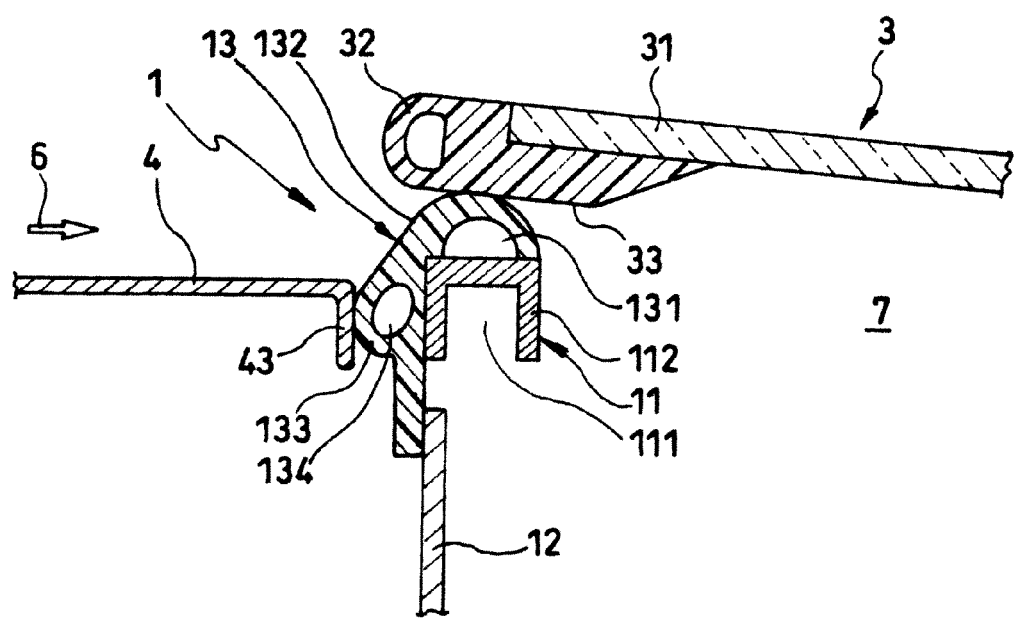
FIG. 3 shows a partial section through a third exemplary embodiment of the wind deflector according to the invention.

When the sliding cover 3 is at least partially open, the seal 13 bears with its surface 132 in a sealing manner against the lower side 33 of the sliding cover 3 (see FIG. 3). Here, partially sealing means a distance between the surface 132 of the seal 13 and the lower side 33 of the sliding cover 3 in the range of 0 to a few millimeters. In this case, the seal 13 absorbs vibrations between the deployment element 11 and the sliding cover 3.

Figure 2B:
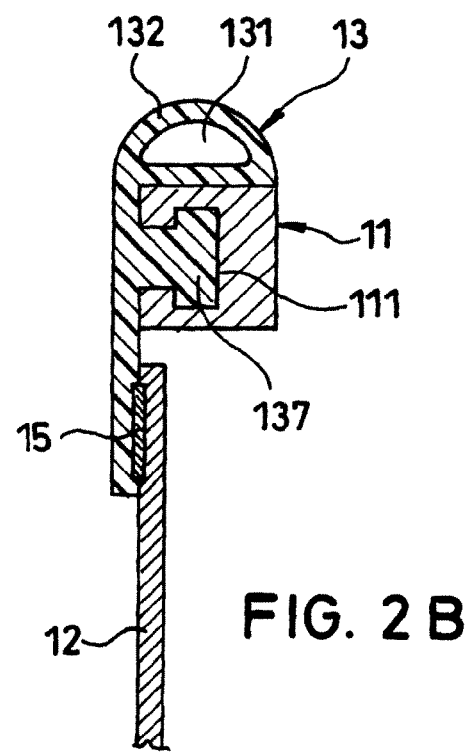
FIG. 2B shows a partial section through a second exemplary embodiment of the wind deflector according to the invention.

FIG. 2B shows a partial section through a second exemplary embodiment of the wind deflector 1 according to the invention. The sealing element is designed as a closed profile seal 13 with a cavity 131 and peg 111. The profile seal 13 is fastened to the deployment element 11, which is designed as a plastic profile part, by the peg 111 being pushed into the groove 116. The seal 13 is fastened by means of an ultrasonic weld seam 15 to the deflector element 12 which is designed as an air-permeable film. An advantage of this embodiment of the invention is that the seal 13 is connected releaseably to the deployment element 111, and therefore permits easy exchange of the deflector element, in the event of the deflector element being damaged. A connection by adhesive bonding can be carried out in a simpler and more rapid manner in terms of the process. Ultrasonic welding is therefore particularly suitable because it is a very rapid process, in comparison, for example, to sewing on by means of a textile thread.

FIG. 3 shows a partial section through a third exemplary embodiment of the wind deflector 1 according to the invention in the region of the front roof flange 43 thereof. The seal 13 is divided into a region 132 of an open seal (sealing lip) which, together with the deployment element 11, forms the cavity 131. Furthermore, the seal 13 has a further region 133 which is designed as a closed seal with a further cavity 134.

The sliding cover 3 is in a slightly open position and has a glass cover 31, a seal 32 and a lower side 33. A relative wind 6 flows over the roof 4 via the flange 43 and is prevented from flowing into the passenger compartment 7 by that region 132 of the seal 13 which is in contact with the lower side 33 of the sliding cover. The further region 133 of the seal 13 bears in a sealing manner against the roof flange 43 and therefore assists in the flow passing over the roof flange 43 with little noise.

Even in the closed position of the sliding cover 3, the seal 13, by means of its damping characteristics, prevents noise being produced by means of vibration between the deployment element 11 and the sliding cover 3.

Figure 4A:
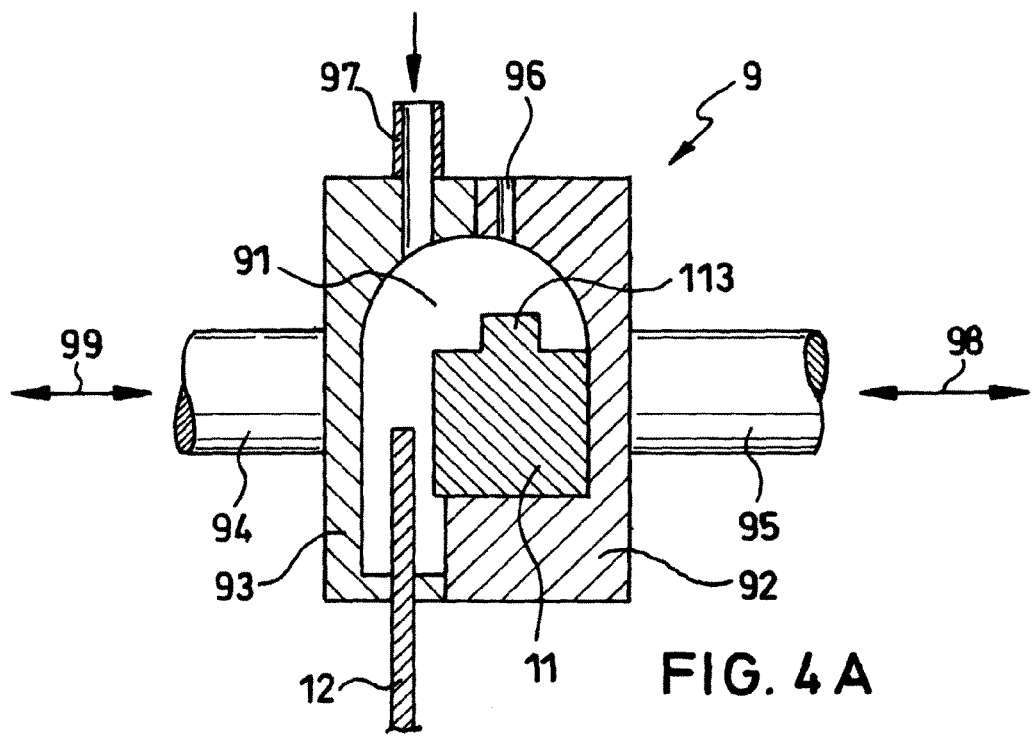
FIG. 4A shows a section through a casting apparatus of an exemplary embodiment of a method according to the invention.

FIG. 4A shows a section through a casting apparatus of an exemplary embodiment of a method according to the invention. The casting apparatus 9 has two casting molds 92, 93 which are arranged opposite each other and are each arranged on linearly moveable (reference numbers 99, 98) pistons 94, 95. Furthermore, the casting apparatus has a means of supplying a liquid sealing material, for example EPDM. The cavity 91 is vented via the venting means 96. The deployment element 11 and an edge section of the deflector element 12 are arranged within the casting apparatus. At the beginning of the production process, the deployment element 11 and the end of the deflector element 12 are positioned in the open casting molds 92, 93. The casting molds 92, 93 are subsequently pressed together in a sealing manner by means of the pistons 94, 95. A sealing material is then injected into the cavity 91 via the supply means 97. Air which is present in the cavity 91 can be conducted away via the venting means 96. At the end of the casting process, the casting molds 92, 93 open and the product of said casting process is removed.

Figure 4B:
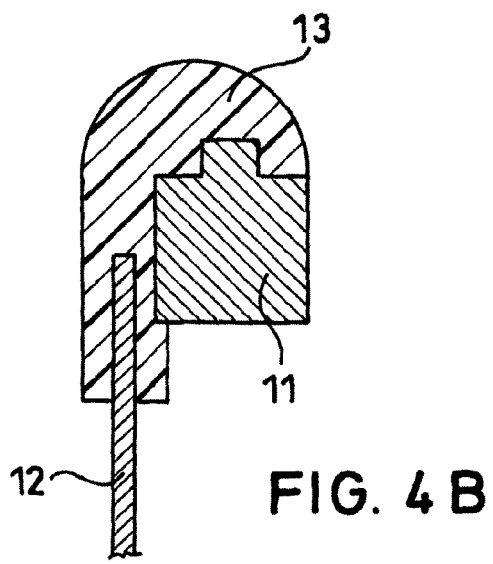
FIG. 4B shows a partial section through an exemplary embodiment of a wind deflector according to the invention, produced as per the method according to the invention.

FIG. 4B shows a partial section through an exemplary embodiment of a wind deflector according to the invention, produced as per the method from FIG. 4A. The sealing element 13 is connected to the deployment element 11 and the peg 113 thereof and to the deflector element 12.

The invention is not restricted to the specific construction of a wind deflector as is illustrated in the above figures, and to the method for production thereof.

In a further possible and likewise advantageous refinement of the invention, the deflector element extends over the entire length of the bow-shaped base element and deployment element. In such a case, in which the deflector element is drawn around the curvatures of the deployment element and/or of the base element, the seal arranged on the upper side of the deployment element can be partially trimmed in the event of it obstructing the functioning of the wind deflector or of the sliding roof.

Furthermore, the deployment element configuration described here can also be applied, for example, to the base element. In this case, the base element is connected to the deflector element in the same manner as the deflector element is connected to the deployment element according to this invention.

The method for producing the deflector element can be varied in diverse ways. For example, the seal can first of all be fastened to the deployment element and, in a further step, the deflector element can be fastened to the seal.

The method for producing the deflector element is preferably also configured as a die casting method.

LIST OF REFERENCE NUMBERS

1 Wind deflector
10 Base element
11 Deployment element
111 Groove
112 Profile
113 Peg
12 Deflector element
13 Sealing element
131 Cavity of the sealing element
132 Region of the sealing element
133 Further region of the sealing element
134 Further cavity of the sealing element
137 Peg of the sealing element
14 Adhesive
15 Connection
3 Moveable roof part
31 Glass cover
32 Sliding cover seal
33 Lower side of the sliding cover
4 Roof
41 Roof edge region
42 Roof opening
43 Front roof flange
5 Direction of movement of the vehicle
6 Relative wind
7 Interior space of the vehicle
9 Casting apparatus
91 Cavity
92, 93 Casting molds
94, 95 Pistons
96 Venting means
97 Feed for melt
98, 99 Direction of movement of the pistons

The invention claimed is:

1. A wind deflector for a vehicle roof opening that can be closed and can be partially opened up by a movable roof part, comprising:
   a bow-shaped base element fitted in a roof opening edge region of a motor vehicle,
   a bow-shaped deployment element arranged above and pivotable with respect to the base element,
   a deflector element arranged between the base element and the deployment element, wherein the deflector element can be stretched open, and
   at least one sealing element fastened to the deployment element for reducing driving noises,
   wherein the deflector element is fastened directly to the sealing element and wherein
   when the roof opening is at least partially open, the sealing element can be brought into contact with a front roof flange of a roof edge to reduce noise caused when relative wind flows over the roof edge.

2. The wind deflector as claimed in claim 1, wherein the sealing element is connected to the deflector element by at least one of a seam, an adhesive, a weld seam, a clamping connection, and a cohesive material joint by the sealing element being injection molded on.

3. The wind deflector as claimed in claim 1 wherein the sealing element has at least one of an open section and a closed section.

4. The wind deflector as claimed in claim 1, wherein the sealing element comprises at least one of microcellular rubber, ethylene-propylene-diene rubber (EPDM), and silicone.

5. The wind deflector as claimed in claim 1, wherein, when the roof opening is closed or is at least partially open, the sealing element is in contact with the movable roof part in at least partially sealing manner, the contact dampening a vibration between the deployment element and the movable roof part when relative wind flows over the roof edge.

6. The wind deflector as claimed in claim 1, wherein the deployment element is connected to the sealing element by at least one of an adhesive, a cohesive material joint by the sealing element being injection molded on, a plug-in connection, a plug-on connection, a clamping connection, an expanding connection.

7. The wind deflector as claimed in claim 1, wherein the deployment element is at least one of a plastic part, an aluminum extruded part, and a magnesium die cast part.

8. The wind deflector as claimed in claim 1 wherein the deflector element is at least one of a fabric and an air-permeable film.

9. The wind deflector as claimed in claim 1, wherein:
the deflector element connects to the sealing element by at least one of sewing, adhesive bonding, welding, clamping, and injection molding the sealing element onto the deflector element; and
the sealing element attaches to the deployment element by at one of adhesive bonding, injection molding the sealing element onto the deployment element, plugging in, plugging on, and clamping.

* * * * *